United States Patent
Jen

(10) Patent No.: US 8,648,166 B2
(45) Date of Patent: Feb. 11, 2014

(54) PROCESS FOR PRODUCING ANTIMONY-FREE PET POLYESTER FIBER EXCELLENT IN NO YELLOWISH LOOK

(75) Inventor: Zo-Chun Jen, Taipei (TW)

(73) Assignee: Nan Ya Plastics Corporation (TW)

( * ) Notice: Subject to any disclaimer, the term of this patent is extended or adjusted under 35 U.S.C. 154(b) by 128 days.

(21) Appl. No.: 13/292,252

(22) Filed: Nov. 9, 2011

(65) Prior Publication Data

US 2012/0059122 A1    Mar. 8, 2012

Related U.S. Application Data

(63) Continuation-in-part of application No. 12/320,227, filed on Jan. 22, 2009, now abandoned.

(51) Int. Cl.
| | |
|---|---|
| *C08G 63/83* | (2006.01) |
| *C08G 63/85* | (2006.01) |
| *D01F 1/04* | (2006.01) |
| *D01F 1/06* | (2006.01) |
| *B01J 21/10* | (2006.01) |

(52) U.S. Cl.
USPC .... 528/279; 528/308.1; 502/113; 264/211.22

(58) Field of Classification Search
USPC ............ 528/279, 308.1; 502/113; 264/211.22
See application file for complete search history.

(56) References Cited

U.S. PATENT DOCUMENTS

| | | | | |
|---|---|---|---|---|
| 3,383,231 A | * | 5/1968 | Allan | 106/430 |
| 5,656,716 A | * | 8/1997 | Schmidt et al. | 528/279 |
| 6,451,959 B1 | * | 9/2002 | Ohmatsuzawa et al. | 528/279 |

* cited by examiner

*Primary Examiner* — Tae H Yoon
(74) *Attorney, Agent, or Firm* — Bacon & Thomas, PLLC

(57) ABSTRACT

An antimony-free PET resin produced by using an inorganic Ti—Mg catalyst and a small amount of blue and red dyes, in the absence of an antimony catalyst or a phosphorus stabilizer; and, in a melt spinning process for producing PET polyester fiber, the PET resin demonstrates excellent spinnability but no yarn breaks or aggregation of $TiO_2$ delustering agent so that the resultant PET polyester fiber features commercially desired in both color tone and glossiness. Especially the PET resin and the PET polyester fiber containing no antimony are therefore environmentally friendly by causing no heavy metal pollution to the environment.

2 Claims, No Drawings

PROCESS FOR PRODUCING ANTIMONY-FREE PET POLYESTER FIBER EXCELLENT IN NO YELLOWISH LOOK

CROSS REFERENCE TO RELATED APPLICATIONS

This application is a CIP of U.S. patent application Ser. No. 12/320,227 filed Jan. 22, 2009, now abandoned.

BACKGROUND OF THE PRESENT INVENTION

1. Field of the Present Invention

The present invention relates to an antimony-free PET resin produced with inorganic Ti—Mg catalyst and a small amount of dyes and, more particularly, to a PET polyester fiber produced from the PET resin having a good color tone and glossiness.

2. Description of Prior Art

In a conventional synthesis process of PET (polyethylene terephthalate), purified terephthalic acid (PTA) and ethylene glycol (EG) are the raw materials to be reacted through a first-stage direct esterification process and a second-stage polycondensation process. An antimony (Sb) catalyst is conventionally added in the second-stage polycondensation process as a polycondensation catalyst. If necessary, a solid-state polymerization process optionally follows the second-stage polycondensation process to increase the molecular weight of the resultant PET resin.

The PET resin such produced, due to its excellent mechanical strength and chemical resistance, is suitable to produce PET polyester fiber. However, for producing PET polyester fiber from the PET resin, in the melt spinning process, a considerable amount of ethylene glycol antimony is evaporated and accumulated on the spinneret because of the antimony-containing polycondensation catalyst for use with the PET resin. Consequently, the accumulated ethylene glycol antimony needs to be frequently wiped from the spinneret or the molten PET polyester can be obstructed from smoothly gushing from orifices of the spinneret, tending to result in yarn breaks.

To remedy this problem, a known approach to PET resin processing technology is to implement a titanium-containing polycondensation catalyst as a replacement for the conventional antimony-containing polycondensation catalyst. This does help prevent filament breaks. However, such titanium-containing polycondensation catalyst can give a yellowish hue to the resultant PET resin, rendering the PET polyester fiber manufactured therefrom less commercially desired due to its yellowish look.

As a known alternative solution, a phosphorus stabilizer is added during the PET resin process in order to reduce the yellowish look of the PET resin caused by the titanium-containing polycondensation catalyst. For instance, U.S. Patent Application Publication No. 2006/0014920 discloses a mixture-based catalyst mixed by tetrabutyltitanate (TBT), product of reaction of TBT and trimellitic anhydride, and triethyl phosphonoacetate (TEPA).

Besides, according to Japanese Patent Application Publication No. 2005-015630, another mixture-based catalyst is adapted to solve the problem of the yellowish look of a PET resin. To obtain the catalyst, a titanium-containing chelate compound made of titanium tetraisopropoxide and citric acid is firstly put into reaction with phosphoric acid to produce a phosphureted titanium chelate catalyst, and then the phosphureted titanium chelate catalyst is added with cobalt acetate, manganese acetate and a phosphide having a ring consisting of six or more members.

Also, according to the prior art, Titanium Dioxide ($TiO_2$) is used as a delustering agent to improve glossiness of resultant PET polyester fiber. Where a PET resin is to be produced with the titanium-containing polycondensation catalyst and phosphorus stabilizer, in order to improve the yellowish look, together with a $TiO_2$ additive for providing functions different from catalysis, $TiO_2$ in the additive is subject to aggregation due to the presence of the phosphorus stabilizer, and the aggregation can adversely affect the quality of the resultant PET polyester fiber.

SUMMARY OF THE INVENTION

In view of the above-mentioned problems ensuing from the conventional approaches, the present invention discloses a PET resin which is produced by using an inorganic Ti—Mg catalyst and a small amount of dyes and a PET polyester fiber produced from the PET resin and improved in both color tone and glossiness. Given the inorganic Ti—Mg catalyst, the PET resin does not require any phosphorus stabilizer and is less yellowish due to the small amount of dyes used. Particularly, the PET resin requires neither an antimony catalyst nor a phosphorus stabilizer, and thus a later melt spinning process for producing PET polyester fiber is free from yarn breaks and $TiO_2$ aggregation so that the PET polyester fiber has the advantage of being commercially desired in both color tone and glossiness.

The PET resin disclosed herein is produced by a method described below:

(a) undergoing a first-stage direct esterification reaction in a reactor to obtain a reaction mixture by reacting purified terephthalic acid with ethylene glycol;

(b) after step (a) being completed, based on the total PET resin weight, adding an inorganic Ti—Mg catalyst containing titanium element 2 to 10 ppm in an amount of ranging from 30 to 150 μm, a blue dye in an amount of ranging from 1 to 5 ppm, a red dye in an amount of ranging from 1 to 3 ppm and $TiO_2$ in an amount of ranging from 0 to 4 wt % at the same time in the reactor; and then (c) undergoing a second-stage polycondensation to obtain the resultant PET resin with intrinsic viscosity ranging from 0.5 to 0.7 dl/g.

The inorganic Ti—Mg catalyst contains titanium element ranging from 1 to 20 wt % and has a molar ratio of titanium to magnesium ranging about from 0.005 to 1, or preferably ranging about from 0.01 to 0.2. And, the inorganic Ti—Mg catalyst may be made in the form of particles with particle diameter ranging from 0.1 to 1.0 μm.

A process for producing antimony-free polyethylene terephthalate (PET) polyester fiber excellent in no yellowish look, comprising the steps of:

(a) producing the above-mentioned inorganic Ti—Mg polycondensation catalyst synthesized by chemical precipitation and satisfied requirements of containing titanium element ranging from 1 to 20 wt %, being made in form of titanium dioxide ($TiO_2$) covered on magnesium hydroxide ($Mg(OH)_2$) to obtain a molar ratio of titanium to magnesium ranging from 0.005 to 1 and having an particle size between 0.1 to 1.0 μm;

(b) producing the above-mentioned antimony-free polyethylene terephthalate (PET) in the present of the inorganic Ti—Mg polycondensation catalyst of step (a) and in the absence of an antimony catalyst and a phosphorus stabilizer; and (c) by a melt spinning process to obtain a glossiness of PET polyester fiber excellent in no yellowish color produced from the polyethylene terephthalate (PET) resin of step (b).

According to the present invention, the PET resin and the PET polyester fiber made therefrom contain no antimony, and are therefore environmentally friendly by causing no heavy metal pollution to the environment.

DETAILED DESCRIPTION OF THE PREFERRED EMBODIMENT

A PET resin of the present invention is characterized in being antimony-free and produced by using an inorganic Ti—Mg catalyst and a small amount of dyes to improve the color tone.

The PET resin disclosed herein is produced by a method described below:

(a) undergoing a first-stage direct esterification reaction in a reactor to obtain a reaction mixture by reacting a diacid component and a diol component; preferably by reacting purified terephthalic acid (PTA) and ethylene glycol (EG);

(b) after step (a) being completed, based on the total PET resin weight, adding an inorganic Ti—Mg catalyst containing titanium element 2 to 10 ppm in an amount of ranging from 30 to 150 ppm, a blue dye in an amount of ranging from 1 to 5 ppm, a red dye in an amount of ranging from 1 to 3 ppm and $TiO_2$ in an amount of ranging from 0 to 4 wt % at the same time in the reactor; and then (c) undergoing a second-stage polycondensation to obtain the resultant PET resin with intrinsic viscosity ranging from 0.5 to 0.7 dl/g; finally, the PET resin is cooled rapidly in cooling water and granulated into PET chips.

With the method, the resultant PET resin is full-bright, bright, semi-dull or full-dull, depending on the presence of the $TiO_2$ added and the amount of the $TiO_2$ added. Specifically speaking, a full-bright PET resin contains no $TiO_2$; a bright PET resin contains 0.01~0.1 wt % of $TiO_2$; a semi-dull PET resin contains 0.2~0.4 wt % of $TiO_2$; and a full-dull PET resin contains 1~4 wt % of $TiO_2$.

In the above-described method, the diacid component is purified terephthalic acid (PTA), iso-phthalic acid, succinic acid, glutaric acid, adipic acid, sebacic acid, the like, or combination thereof.

In the above-described method, the dial component is ethylene glycol (EG), diethylene glycol, 1,3-propanediol, 1,4-butanediol, the like, or combination thereof.

The inorganic Ti—Mg catalyst used in the present invention is synthesized by chemical precipitation as described below:

1. Allowing an aqueous $MgCl_2$ solution and an aqueous NaOH solution to react at 170° C. for about 30 minutes, and afterward, filtering and washing the reactant to obtain $Mg(OH)_2$ aqueous slurry; and 2. Mixing an aqueous $TiCl_4$ solution and an aqueous NaOH solution, adding the mixed solution into the $Mg(OH)_2$ aqueous slurry drop by drop, ripening the resultant slurry for one hour to make $TiO_2$ cover $Mg(OH)_2$ particles, filtering the slurry, and washing, dehydrating as well as comminuting the filtered solid, thereby obtaining the inorganic Ti—Mg catalyst in the form of particles.

The inorganic Ti—Mg catalyst particles have a particle diameter ranging from 0.1 to 1.0 μm. The inorganic Ti—Mg catalyst contains titanium element ranging from 1 to 20 wt % and has a molar ratio of titanium to magnesium ranging about from 0.005 to 1, or preferably ranging about from 0.01 to 0.2.

The inorganic Ti—Mg catalyst particles produced with the aforesaid method excels conventional organic catalysts and demonstrates advantages as follows:

1. In the polycondensation process of the PET resin, the inorganic Ti—Mg catalyst is free from being inactivated by $TiO_2$ whereas an organic catalyst tends to be inactivated in the presence of $TiO_2$; and 2. Since the inorganic Ti—Mg catalyst particles possess a specially structural feature that titanium element is uniformly distributed over surfaces of the $Mg(OH)_2$ particles, the result was that in the polycondensation process the inorganic Ti—Mg catalyst particles are capable of maximizing the area of surface of titanium for reaction with a reactant. So that, for achieving the same predetermined catalysis in the polycondensation process, the inorganic Ti—Mg catalyst particles if compared with an organic catalyst may contains much less amount of titanium element than that of the organic catalyst does.

The inorganic Ti—Mg catalyst particles are then mixed with ethylene glycol to form a catalyst solution with a concentration ranging from 0.01 to 15 wt %.

The PET resin of the present invention is applicable to a melt spinning process for producing PET polyester fiber. Prior to the melt spinning process, the PET resin has to be crystallized and dehydrated to render its water contents less than 50 ppm for preventing the PET chips from hydrolyzing in the melt spinning process. The dehydrated PET resin is extruded with a screw extruder at temperature 260° C. to 295° C. and then melted and spun by a spinning assembly at temperature 275° C. to 300° C. to form yarn. After undergoing cross-wind cooling and finishing, the yarn gets twisted with guiding rollers and taken up at 4000 m/min to form POY (Pre-Oriented Yarn) cakes.

The PET resin of the present invention and the PET polyester fiber made therefrom possess the following features.

1. Produced by using inorganic Ti—Mg catalyst and the small amount of blue and red dyes, the PET resin of the present invention needs no phosphorus stabilizer to prevent the yellowish color tone as that presented in conventional PET resin and gives a color tone similar to that of PET resin produced in the presence of an antimony-containing catalyst.

2. Since the PET resin of the present invention contains no phosphorus stabilizer, it eradicates the problem of inhibition of catalytic activity of the titanium polycondensation catalyst by a phosphorus stabilizer. Hence, it is feasible to produce the PET resin with less amount of the titanium polycondensation catalyst according to the present invention.

3. Since the PET resin of the present invention contains neither an antimony catalyst nor a phosphorus stabilizer, in the melt spinning process, the provided PET resin exhibits excellent spinnability and prevents yarn breaks as well as $TiO_2$ delustering agent aggregation, so that the resultant PET polyester fiber may present excellent color tone and glossiness.

4. As the PET polyester fiber resin made of the PET resin of the present invention by the melt spinning process contains no heavy metals of antimony and cobalt, it is environmentally friendly and causes no heavy metal-based pollution to the environment.

In the following examples, the Intrinsic Viscosity (IV) of the PET copolymers and the hues of the PET resins are measured by the method given below.

The IV is analyzed by an Ubelohde viscosity meter at 25° C. in a mixed solvent of phenol and tetra-chloro ethane mixed in a ratio of 3:2.

The hues of the PET resin particles are taken by a spectrophoto meter from TOKYO DENSHOKU CO., LTD bearing the model no. TC-1800MK II, and are expressed by L/a/b.

The higher the "L" value is, the whiter the PET resin particles are. The lower the "L" value is, the darker the PET resin particles are. The higher the "a" value is, the redder the PET resin particles are. The lower the "a" value is, the greener the PET resin particles are. The higher the "b" value is, the yellower the PET resin particles are. The lower the "b" value is, the bluer the PET resin particles are.

The spinning statuses of the PET polyester fiber in the following examples are determined by agglomerate on the spinneret, yarn break, and broken filament.

Therein, the frequency of yarn breaks in continuous spinning for 2 days is taken and the number of broken filaments at the lateral of a 9-kg POY cake is counted for determining the spinning statuses of each produced PET resin.

Example 1

In a 30 l, stainless steel reactor equipped with an eclectic heater, 12.11 kg of PET oligomer and 3.87 kg of ethylene glycol (EG) are mixed under atmospheric pressure and heated to 260° C. Then 1.3-1.6 kg of distilled EG is collected and removed.

Prior to the polycondensation process, 50 ppm of inorganic Ti—Mg catalyst containing 3.5 ppm of titanium element therein, 2 ppm of blue dye (e.g. Blue 104) and 1 ppm of red dye (e.g. Red 195) are successively added in to the reactor.

Then the reactor is vacuated, allowing the pressure to be gradually reduced to less than 1 mmHg. Afterward, the prepolycondensation process is performed at 270° C., and the polycondensation process is performed at 280° C. Finally, 11.47 kg of resultant PET resin having intrinsic viscosity (IV) of 0.651 dl/g is obtained, and the PET chips have hue L/a/b=48/−3.0/4.2.

Then the PET chips are crystallized and dehydrated to be later melted in a screw extruder at 296° C. The melt is extruded with a spinneret having 72 orifices with diameter of 0.2 mm and cooled by cross-wind set in temperature of 23° C. and at speed of 0.55 m/s. After finishing and getting twisted, the resultant yarn is taken up at 2850 m/min to form full-bright POY having a fiber fineness of 65 den/72 f.

The spinning statuses of the PET polyester fiber, including agglomerate on the spinneret, yarn breaks and broken filaments, are listed in Table 1.

Example 2

A PET resin is made by a method similar to that described in Example 1 except that, in Example 2, prior to the polycondensation process, $TiO_2$ is added as an additive with an adding amount of 0.35 wt % of the PET resin.

The resultant PET resin has intrinsic viscosity (IV) of 0.648 dl/g, and the PET chips have hue of L/a/b=74/−1.115.0.

Then the resultant PET chips are crystallized and dehydrated before being processed by the method described in Embodiment 1, finally a semi-dull POY having a fiber fineness of 65 den/72 f is then produced.

The spinning statuses of the PET polyester fiber made from the PET chips are also listed in Table 1.

Comparative Example 1

A PET resin is made by a method similar to that described in Example 1 except that TBT is used to replace the Ti—Mg catalyst as the polycondensation catalyst, wherein the TBT contains 6 ppm of titanium element, and that 217 ppm of TEPA is added. The resultant PET resin has intrinsic viscosity (IV) of 0.650 dl/g, and the PET chips have hue of L/a/b=47/−3.0/6.9.

The spinning statuses of the PET polyester fiber made from the PET chips are also listed in Table 1.

Comparative Example 2

A PET resin is made by a method similar to that described in Example 2 except that TBT is used to replace the Ti—Mg catalyst as the polycondensation catalyst, wherein the TBT contains 6 ppm of titanium element, and that 217 ppm of TEPA as well as 0.35 wt % of $TiO_2$ are added. The resultant PET resin has intrinsic viscosity (IV) of 0.642 dl/g, and the PET chips have hue of L/a/b=73/−1.517.5.

The spinning statuses of the PET polyester fiber made from the PET chips are also listed in Table 1.

Comparative Example 3

A PET resin is made by a method similar to that described in Example 2 except that 400 ppm of antimony acetate replaces the Ti—Mg catalyst as the polycondensation catalyst, wherein the antimony acetate has 162 ppm of antimony. The resultant ester copolymer has intrinsic viscosity IV of 0.650 dl/g, and the PET chips have hue of L/a/b=74/−3.5/4.4.

The spinning statuses of the PET polyester fiber made from the PET chips are also listed in Table 1.

CONCLUSION

The following conclusions are drawn from the results of Examples 1 and 2 and Comparative Examples 1 to 3, as shown in Table 1:

1. Superior hues are presented by the PET resins of Example 1 (Inorganic Ti—Mg catalyst used) and Comparative Example 1 (TBT catalyst used), where no $TiO_2$ is added.

2. Among the Example and Comparative Examples where $TiO_2$ is added, the resultant PET resins of Example 2 (Inorganic Ti—Mg catalyst used) and Comparative Example 3 (Antimony catalyst used) present similar hues that are both superior to that of Comparative Example 2 (TBT catalyst used).

3. The resultant PET resins of Example 1 (Inorganic Ti—Mg catalyst used) and Example 2 (Inorganic Ti—Mg catalyst and $TiO_2$ used) provide excellent spinnability in spinning, for example, causing no accumulation on the spinneret, having no yarn break in 2-day continuous spinning, and presenting less broken filaments.

TABLE 1

| | Item | Example 1 | Example 2 | Comparative Example 1 | Comparative Example 2 | Comparative Example 3 |
|---|---|---|---|---|---|---|
| Catalyst and Additive | Inorganic Ti—Mg (Ti concentration) ppm | 50 (3.5) | 50 (3.5) | — | — | — |
| | Organic TBT[(1)] (Ti concentration) ppm | — | — | 50 (6.0) | 50 (6.0) | — |
| | Antimony Acetate (Sb concentration) ppm | — | — | — | — | 400 (162) |
| | TEPA ppm | — | — | 217 | 217 | 217 |

TABLE 1-continued

| | | Example | | | | |
|---|---|---|---|---|---|---|
| | Item | Example 1 | Example 2 | Comparative Example 1 | Comparative Example 2 | Comparative Example 3 |
| | TiO$_2$ (wt %) | — | 0.35 | — | 0.35 | 0.35 |
| | Blue/Red Dye ppm | 2/1 | 2/1 | 2/1 | 2/1 | 2/1 |
| Polymerization Time, IV, Hue | Polymerization Time (Min) | 109 | 112 | 100 | 142 | 110 |
| | IV (dl/g) | 0.651 | 0.648 | 0.650 | 0.642 | 0.650 |
| | L/b[3] | 48/4.2 | 74/5.0 | 47/6.9 | 73/7.5 | 74/4.4 |
| Spinning Statuses | Foreign Bodies on Spinneret | Clean | Clean | Clean | Clean | Yellow Agglomerate |
| | Yarn Break[4] | no yarn break | no yarn break | no yarn break | 1 to 2 times of yarn breaks | 3 or more times of yarn breaks |
| | Broken Filament[5] | no broken filament observed | no broken filament observed | no broken filament observed | 1-3 broken filaments observed | more than 3 broken filaments observed |

Note[1]:
TBT means tetrabutyltitanate.
Note[2]:
TEPA means triethyl phosphonoacetate
Note[3]:
Measured with Hunter color meter, higher L value representing whiter and greater transparency, higher b value representing more yellowish appearance, and lower b value representing more blueish appearance.
Note[4]:
The frequency of yarn break is counted in 2-day continuous spinning.
Note[5]:
The numbers of broken filaments at the lateral of 9-kg POY cakes are observed and counted.

What is claimed is:

1. A process for producing antimony-free polyethylene terephthalate fiber, excellent in no yellowish look, comprising the steps of:
  (a) producing an inorganic Ti—Mg polycondensation catalyst synthesized by chemical precipitation and satisfied requirements of containing titanium element ranging from 1 to 20 wt %, being made in form of titanium dioxide (TiO$_2$) covered on magnesium hydroxide (Mg(OH)$_2$) to obtain a molar ratio of titanium to magnesium ranging from 0.005 to 1 and having an particle size between 0.1 to 1.0 μm;
  wherein the organic Ti—Mg catalyst is produced by the steps of:
    (a1) allowing an aqueous MgCl$_2$ solution and an aqueous NaOH solution to react at 170° C. for about 30 minutes, and afterward, filtering and washing the reactant to obtain Mg(OH)$_2$ aqueous slurry; and
    (a2) mixing an aqueous TiCl$_4$ solution and an aqueous NaOH solution, adding the mixed solution into the Mg(OH)$_2$ aqueous slurry drop by drop, ripening the resultant slurry for one hour to make TiO$_2$ cover Mg(OH)$_2$ particles, filtering the slurry, and washing, dehydrating as well as comminuting the filtered solid, thereby obtaining the inorganic Ti—Mg catalyst in the form of particles;
  (b) producing an antimony-free polyethylene terephthalate (PET) in the absence of an antimony catalyst and a phosphorus stabilizer, comprising the steps of:
    (i) undergoing a first-stage direct esterification reaction in a reactor to obtain a reaction mixture by reacting purified terephthalic acid with ethylene glycol;
    (ii) after step (i) being completed, based on the total reaction mixture weight, adding the following additives into the reactor at same time:
      (1) the inorganic Ti—Mg catalyst made of step (a) in an amount of ranging from 30 to 150 ppm, wherein the inorganic Ti—Mg catalyst containing titanium element 2 to 10 ppm;
      (2) a blue dye in an amount of ranging from 1 to 5 ppm;
      (3) a red dye in an amount of ranging from 1 to 3 ppm and
      (4) titanium dioxide (TiO$_2$) in an amount of ranging from 0 to 4 wt %; and
    (iii) undergoing a second-stage polycondensation to obtain a polyethylene terephthalate (PET) resin, containing polyethylene terephthalate (PET), blue dye, red dye and titanium dioxide (TiO$_2$) with intrinsic viscosity ranging from 0.5 to 0.7 dl/g; and
  (c) by a melt spinning process to obtain a glossiness of PET polyester fiber excellent in no yellowish color produced from the polyethylene terephthalate (PET) resin of step (b).

2. The process for producing antimony-free polyethylene terephthalate fiber as defined in claim 1, wherein the inorganic Ti—Mg catalyst produced in step (a) contains a molar ratio of titanium to magnesium ranging from 0.01 to 0.2.

* * * * *